United States Patent
Taguchi

(10) Patent No.: US 8,363,346 B2
(45) Date of Patent: Jan. 29, 2013

(54) MAGNETIC HEAD AND DISK DRIVE WITH SAME

(75) Inventor: Tomoko Taguchi, Kunitachi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 88 days.

(21) Appl. No.: 12/984,531

(22) Filed: Jan. 4, 2011

(65) Prior Publication Data

US 2011/0242694 A1    Oct. 6, 2011

(30) Foreign Application Priority Data

Mar. 30, 2010  (JP) .................. 2010-079073

(51) Int. Cl.
G11B 21/02 (2006.01)
G11B 27/36 (2006.01)
G11B 5/127 (2006.01)
G11B 5/17 (2006.01)
G11B 5/10 (2006.01)

(52) U.S. Cl. ....... 360/75; 360/31; 360/110; 360/123.02; 360/123.11; 360/123.12

(58) Field of Classification Search .................. None
See application file for complete search history.

(56) References Cited

U.S. PATENT DOCUMENTS

| 6,954,340 B2 * | 10/2005 | Shukh et al. .................. 360/317 |
| 2006/0164759 A1 * | 7/2006 | Okada et al. .................. 360/126 |
| 2010/0157462 A1 * | 6/2010 | Koizumi et al. .................. 360/71 |
| 2010/0157473 A1 * | 6/2010 | Fuchizaki et al. ....... 360/125.02 |
| 2010/0321835 A1 * | 12/2010 | Zhang et al. .................. 360/319 |

FOREIGN PATENT DOCUMENTS

| JP | 63-057852 | 11/1988 |
| JP | 06-259710 | 9/1994 |
| JP | 2004-39148 | 2/2004 |
| JP | 2005-182987 | 7/2005 |
| JP | 2008-171503 | 7/2008 |
| JP | 2009-129519 | 6/2009 |

OTHER PUBLICATIONS

Japanese Application No. 2010-079073 Office Action (Jun. 14, 2011).

* cited by examiner

*Primary Examiner* — Regina N Holder
(74) *Attorney, Agent, or Firm* — Patterson & Sheridan, LLP

(57) ABSTRACT

According to one embodiment, a magnetic head for perpendicular recording includes a first magnetic core includes a main pole configured to produce a recording magnetic field, and a return pole configured to reflux magnetic flux from the main pole to form a magnetic circuit in conjunction with the main pole, a first coil configured to excite magnetic flux in the magnetic circuit, side shields arranged individually on opposite sides of the main pole transversely relative to a track so as to be magnetically separated from the main pole and formed integrally with the return pole, a second magnetic core configured to form a physically closed magnetic path, a part of which comprises the return pole, and a second coil wound around the second magnetic core and configured to excite magnetic flux in the closed magnetic path.

9 Claims, 10 Drawing Sheets

MAGNETIC HEAD AND DISK DRIVE WITH SAME

CROSS-REFERENCE TO RELATED APPLICATIONS

This application is based upon and claims the benefit of priority from Japanese Patent Application No. 2010-079073, filed Mar. 30, 2010; the entire contents of which are incorporated herein by reference.

FIELD

Embodiments described herein relate generally to a magnetic head for perpendicular magnetic recording used in a disk drive and the disk drive provided with the head.

BACKGROUND

A disk drive, such as a magnetic disk drive, comprises a magnetic disk, spindle motor, magnetic head, and carriage assembly. The magnetic disk is disposed in a base. The spindle motor supports and rotates the disk. The magnetic head reads and writes data from and to the disk. The carriage assembly supports the head for movement relative to the disk. The carriage assembly comprises a rotatably supported arm and a suspension extending from the arm, and the magnetic head is supported on an extended end of the suspension. The head comprises a slider mounted on the suspension and a head section disposed on the slider. The head section comprises a recording element for writing and a reproduction element for reading.

Magnetic heads for perpendicular magnetic recording have recently been proposed in order to increase the recording density and capacity of a magnetic disk drive or reduce its size. In one such magnetic head, a recording head comprises a main pole configured to produce a perpendicular magnetic field, return or write/shield pole, and coil. The return pole is located on the trailing side of the main pole with a write gap therebetween and configured to close a magnetic path that leads to a magnetic disk. The coil serves to pass magnetic flux through the main pole.

In recording a record pattern along a track of the magnetic disk, recording magnetic fields also simultaneously leak from the opposite sides of the main pole transversely relative to the track. There is provided a head that comprises side shields arranged individually on the opposite sides of the main pole transversely relative to the track, whereby the leakage magnetic fields are reduced.

In recording data in a perpendicular recording medium by means of the magnetic head for perpendicular recording constructed in this manner, a substantially perpendicular magnetic field is formed on a surface of the medium just below the main pole. This magnetic field returns to the return pole through a soft magnetic layer below a recording layer of the perpendicular recording medium. However, a certain region just below the return pole includes an area on which magnetic fields are concentrated. In some cases, the concentrated magnetic fields may destabilize magnetization of the recording layer and erase or degrade recorded data.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a magnetic head for perpendicular recording is configured to record data in a recording medium which comprises a recording layer with a magnetic anisotropy perpendicular to a surface of the medium. The magnetic head comprises: a first magnetic core comprising a main pole, which comprises a distal end portion opposed to the recording medium and is configured to produce a recording magnetic field, and a return pole opposed to a trailing side of the main pole with a write gap therebetween and configured to reflux magnetic flux from the main pole to form a magnetic circuit in conjunction with the main pole; a first coil configured to excite magnetic flux in the magnetic circuit comprising the main pole and the return pole; side shields arranged individually on opposite sides of the main pole transversely relative to a track so as to be magnetically separated from the main pole and formed integrally with the return pole; a second magnetic core configured to form a physically closed magnetic path, a part of which comprises the return pole; and a second coil wound around the second magnetic core and configured to excite magnetic flux in the closed magnetic path comprising the second magnetic core.

A first embodiment in which a disk drive is applied to a hard disk drive (HDD) will now be described in detail with reference to the accompanying drawings.

Figure 1:
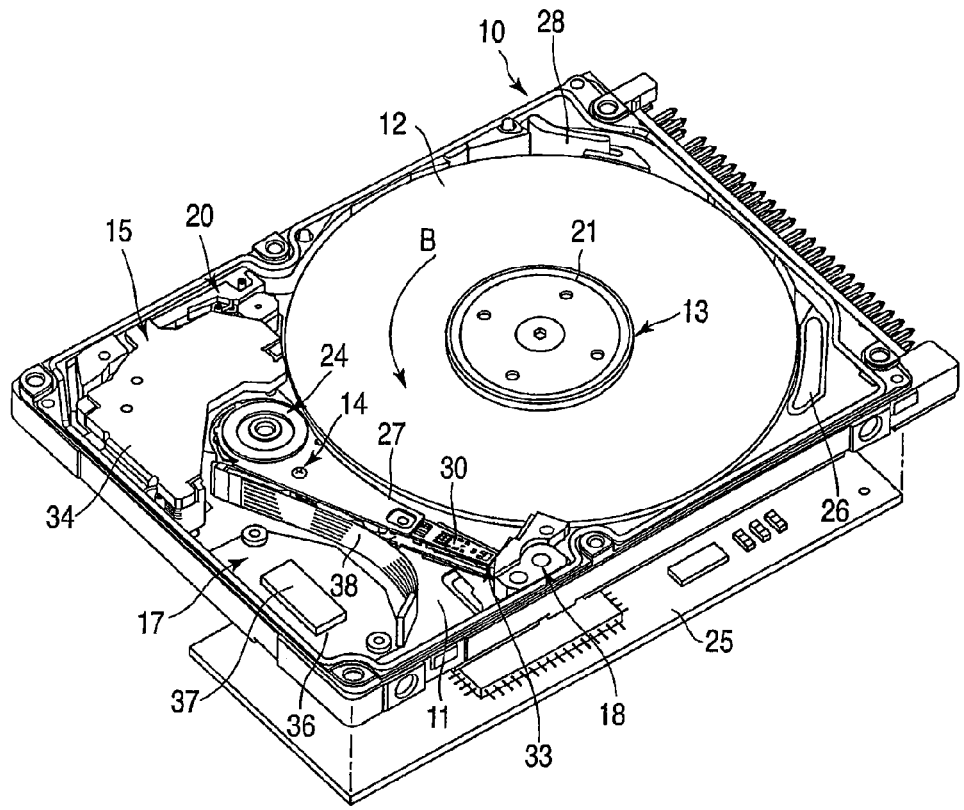
FIG. 1 is an exemplary perspective view showing an HDD according to a first embodiment.
Figure 2:
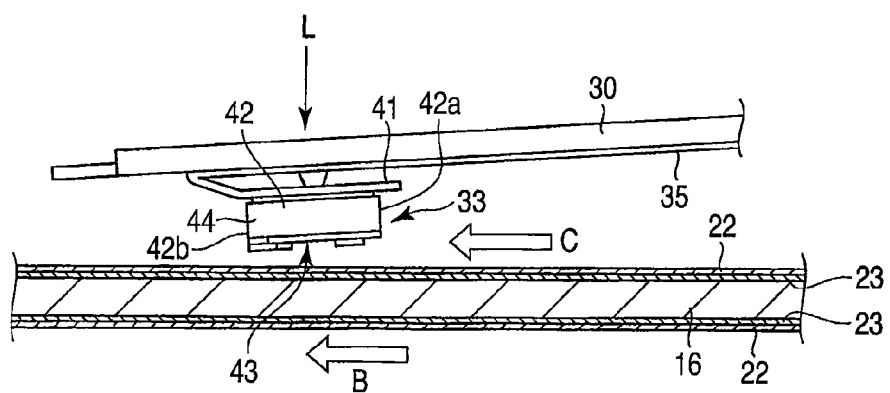
FIG. 2 is an exemplary side view showing a magnetic head and suspension of the HDD.

FIG. 1 shows the internal structure of the HDD with its top cover removed, and FIG. 2 shows a flying magnetic head. As shown in FIG. 1, the HDD comprises a case 10, which comprises a base 11 in the form of an open-topped rectangular box and a top cover (not shown) in the form of a rectangular plate. The top cover is attached to the base by screws so as to close the top opening of the base. Thus, the case 10 is kept airtight inside and can communicate with the outside through a breather filter 26 only. The base 11 and the top cover are formed of a metallic material such as aluminum, iron, stainless steel, or cold-rolled carbon steel.

The base 11 carries thereon a magnetic disk 12, for use as a recording medium, and a mechanical unit. The mechanical unit comprises a spindle motor 13, a plurality (e.g., two) of magnetic heads 33, head actuator 14, and voice coil motor (VCM) 15. The spindle motor 13 supports and rotates the magnetic disk 12. The magnetic heads 33 record and reproduce data in and from the disk 12. The head actuator 14 supports the heads 33 for movement relative to the disk 12. The VCM 15 pivots and positions the head actuator. The base 11 further carries a ramp load mechanism 18, inertial latch mechanism 20, and board unit 17. The ramp load mechanism 18 holds the magnetic heads 33 in positions off the magnetic disk 12 when the heads are moved to the outermost periphery of the disk. The inertial latch mechanism 20 holds the head actuator 14 in a retracted position if the HDD is jolted, for example. Electronic components, such as a preamplifier, head IC, etc., are mounted on the board unit 17.

A printed circuit board 25 that constitutes a control section is attached to the outer surface of a bottom wall of the base 11 by screws so as to face the bottom wall of the base. The circuit board 25 controls the operations of the spindle motor 13, VCM 15, and magnetic heads 33 through the board unit 17.

As shown in FIGS. 1 and 2, the magnetic disk 12 is a perpendicular two-layer film medium. The disk 12 comprises a substrate 16 formed of a nonmagnetic disk with a diameter of, for example, about 2.5 inches. A soft magnetic layer 23 called a soft magnetic underlayer is formed on each surface of the substrate 16. The soft magnetic layer 23 is overlaid by a perpendicular magnetic recording layer 22, which has a magnetic anisotropy perpendicular to the disk surface. Further, a protective film is formed on the recording layer 22.

As shown in FIG. 1, the magnetic disk 12 is coaxially fitted on the hub of the spindle motor 13 and clamped and secured to the hub by a clamp spring 21, which is attached to the upper end of the hub by screws. The disk 12 is rotated at a predetermined speed in the direction of arrow B by the spindle motor 13.

The head actuator 14 comprises a bearing 24 secured to the bottom wall of the base 11 and a plurality of arms 27 extending from the bearing. The arms 27 are arranged parallel to the surfaces of the magnetic disk 12 and at predetermined intervals and extend in the same direction from the bearing 24. The head actuator 14 comprises elastically deformable suspensions 30 each in the form of an elongated plate. Each suspension 30 is formed of a plate spring, the proximal end of which is secured to the distal end of its corresponding arm 27 by spot welding or adhesive bonding and which extends from the arm. Each suspension 30 may be formed integrally with its corresponding arm 27. The magnetic heads 33 are supported individually on the respective extended ends of the suspensions 30. Each arm 27 and its corresponding suspension 30 constitute a head suspension, and the head suspension and each magnetic head 33 constitute a head suspension assembly.

As shown in FIG. 2, each magnetic head 33 comprises a substantially cuboid slider 42 and read/write head section 44 on an outflow end (trailing end) of the slider. Each head 33 is secured to a gimbal spring 41 on the distal end portion of each corresponding suspension 30. A head load L directed to the surface of the magnetic disk 12 is applied to each head 33 by the elasticity of the suspension 30. The two arms 27 are arranged parallel to and spaced apart from each other, and the suspensions 30 and heads 33 mounted on these arms face one another with the magnetic disk 12 between them.

Each magnetic head 33 is electrically connected to a main flexible printed circuit (FPC) board 38 (described later), through the suspension 30 and a relay FPC 35 on the arm 27.

As shown in FIG. 1, the board unit 17 comprises an FPC main body 36 formed of a flexible printed circuit board and the main FPC 38 extending from the FPC main body. The FPC main body 36 is secured to the bottom surface of the base 11. The electronic components, including a preamplifier and head IC 37, are mounted on the FPC main body 36. An extended end of the main FPC 38 is connected to the head actuator 14 and also connected to each magnetic head 33 through each relay FPC 35.

The VCM 15 comprises a support frame (not shown) extending from the bearing 24 in the direction opposite to the arms 27 and a voice coil supported on the support frame. When the head actuator 14 is assembled to the base 11, the voice coil is located between a pair of yokes 34 that are secured to the base 11. Thus, the voice coil, along with the yokes and a magnet secured to the yokes, constitutes the VCM 15.

If the voice coil of the VCM 15 is energized with the magnetic disk 12 rotating, the head actuator 14 pivots, whereupon each magnetic head 33 is moved to and positioned on a desired track of the magnetic disk 12. As this is done, the head 33 is moved radially relative to the disk 12 between the inner and outer peripheral edges of the disk.

Figure 3:
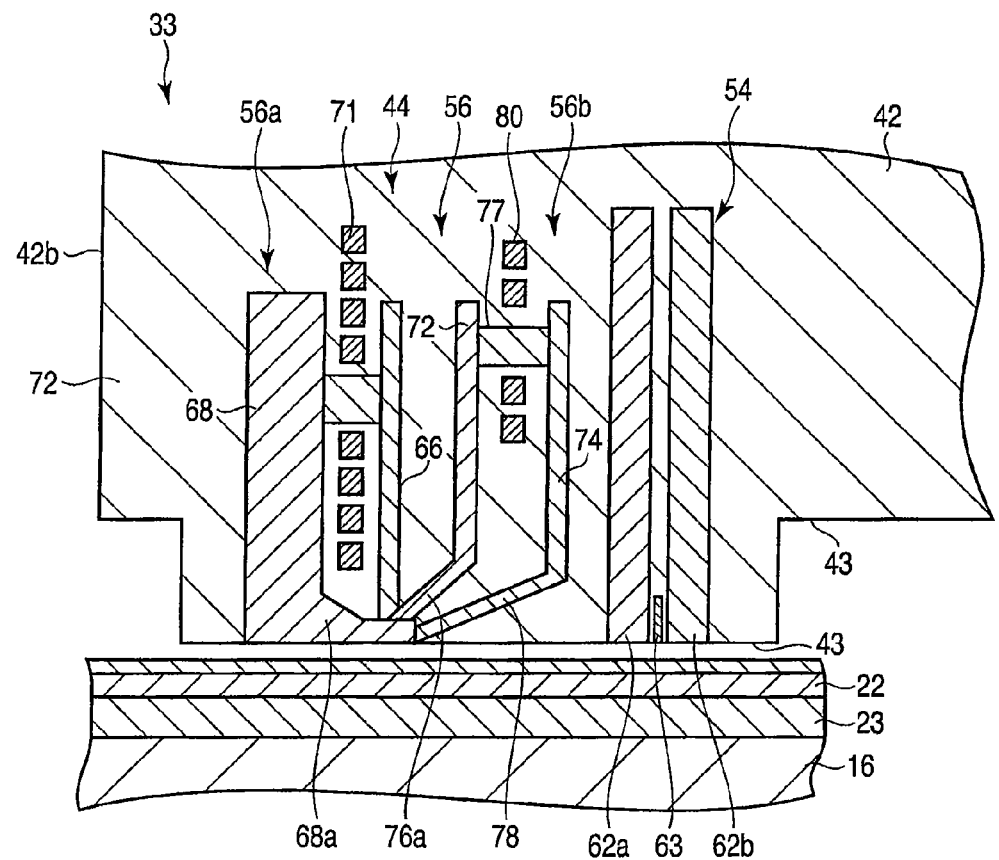
FIG. 3 is an exemplary enlarged sectional view showing a head section of the magnetic head.

The following is a detailed description of a configuration of each magnetic head 33. FIG. 3 is an exemplary enlarged sectional view showing the head section 44 of the head 33.

As shown in FIGS. 2 and 3, each magnetic head 33 is formed as a flying head, and comprises the substantially cuboid slider 42 and the head section 44 formed on the outflow or trailing end of the slider. The slider 42 is formed of, for example, a sintered body (AlTic) containing alumina and titanium carbide, and the head section 44 is a thin film.

The slider 42 has a rectangular disk-facing surface or air-bearing surface (ABS) 43 configured to face a surface of the magnetic disk 12. The slider 42 is caused to fly by airflow C that is produced between the disk surface and the ABS 43 as the magnetic disk 12 rotates. The direction of airflow C is coincident with a direction of rotation B of the disk 12. The slider 42 is located on the surface of the disk 12 in such a manner that the longitudinal direction of the ABS 43 is substantially coincident with the direction of airflow C.

The slider 42 comprises leading and trailing ends 42a and 42b on the inflow and outflow sides, respectively, of airflow C. The ABS 43 of the slider 42 is formed with leading and trailing steps, side steps, negative-pressure cavity, etc., which are not shown.

As shown in FIG. 3, the head section 44 is formed as a dual-element magnetic head, comprising a reproduction head 54 and recording head 56 formed on the trailing end 42b of the slider 42 by thin-film processing.

The reproduction head 54 comprises a magnetic film 63 having a magnetoresistive effect and shield films 62a and 62b located on the trailing and leading sides, respectively, of the magnetic film 63 so as to sandwich the magnetic film between them. The respective lower ends of the magnetic film 63 and shield films 62a and 62b are exposed in the ABS 43 of the slider 42.

Figure 4:
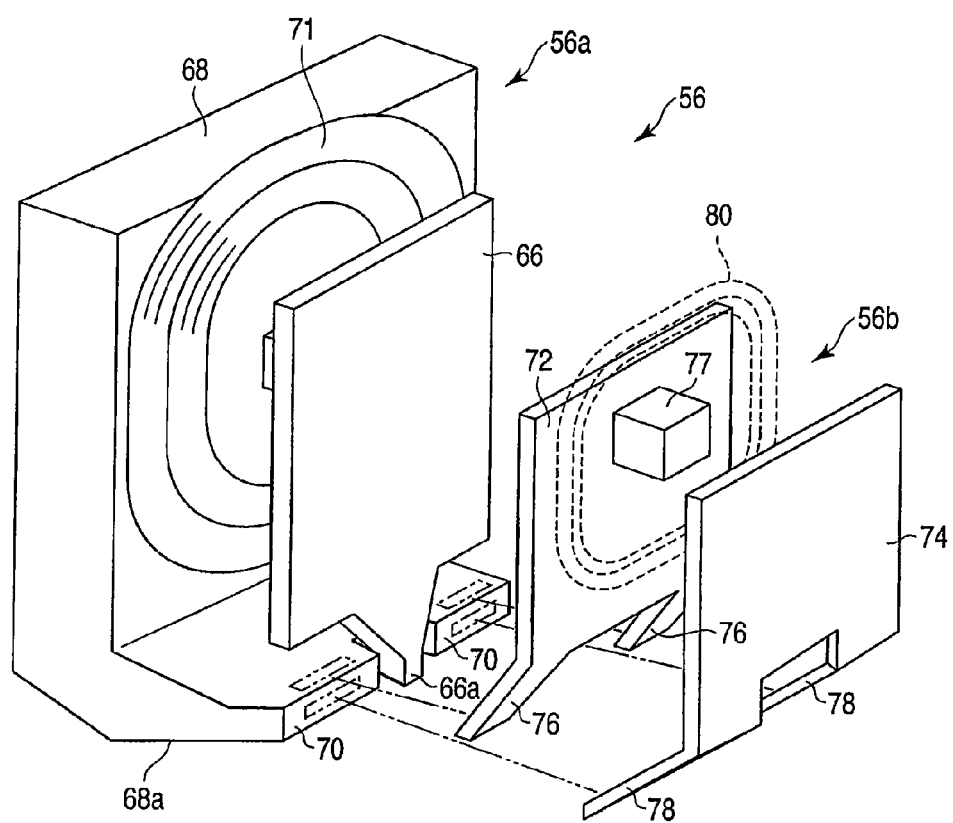
FIG. 4 is an exemplary exploded perspective view schematically showing a recording head of the magnetic head.
Figure 5:
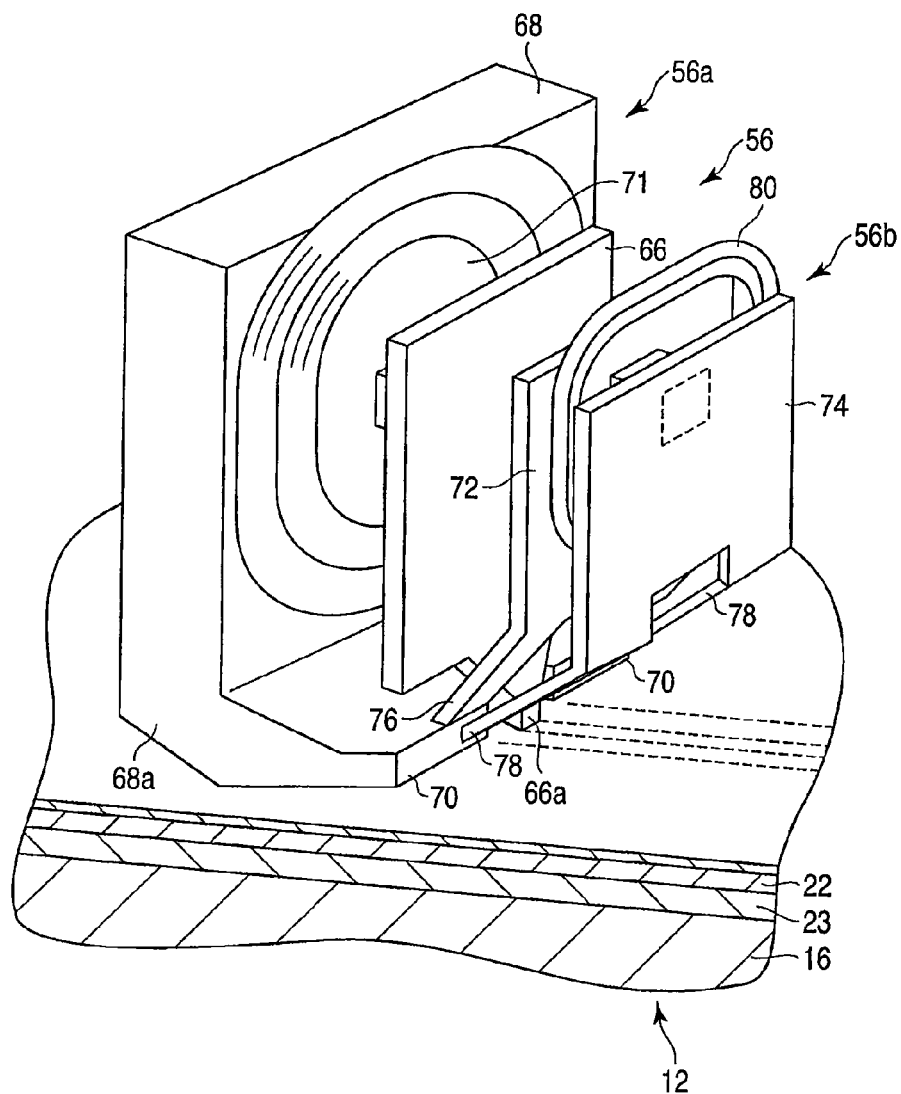
FIG. 5 is an exemplary perspective view schematically showing the recording head of the magnetic head.
Figure 6:
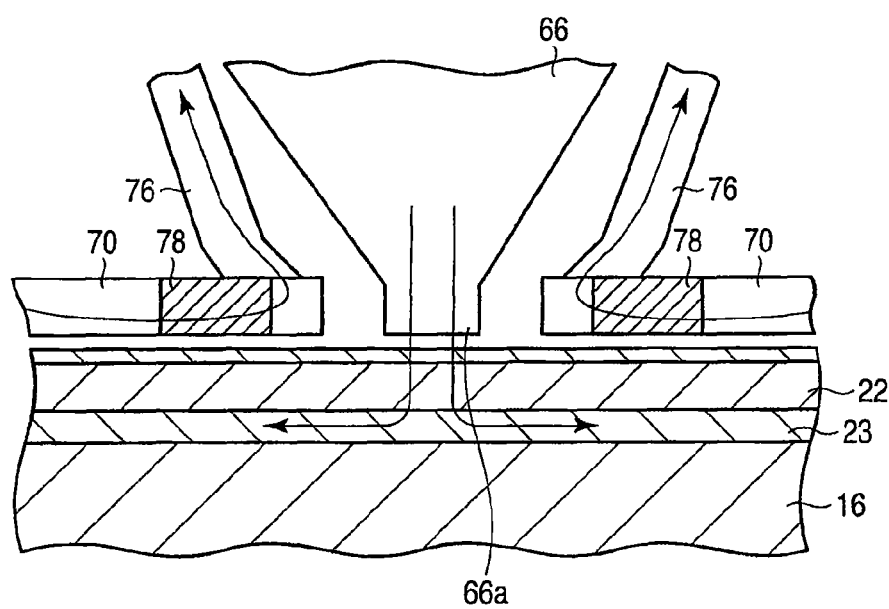
FIG. 6 is an exemplary front view of a disk-side end portion of the recording head taken from the side of a main pole.
Figure 7:
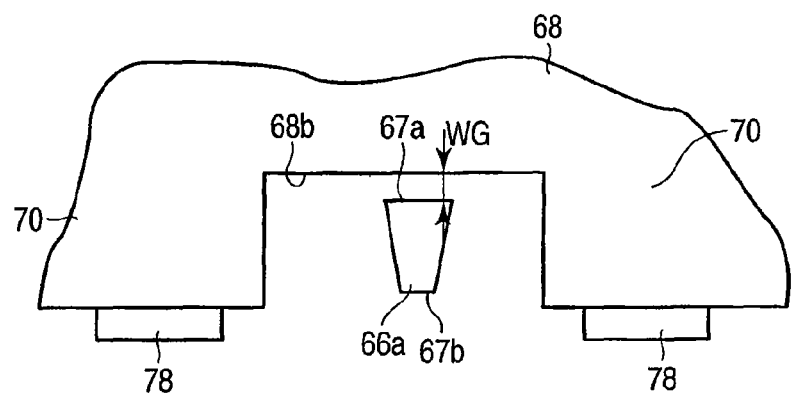
FIG. 7 is an exemplary plan view of the recording head section taken from the side of an ABS of a slider.

The recording head 56 is located nearer to the trailing end 42b of the slider 42 than the reproduction head 54. FIG. 4 is an exemplary exploded perspective view schematically showing the recording head 56, and FIG. 5 is an exemplary perspective view schematically showing the recording head 56 and magnetic disk 12. FIG. 6 is an exemplary front view of a disk-side end portion of the recording head taken from the side of a main pole, and FIG. 7 is an exemplary plan view of the recording head section taken from the side of the ABS 43 of the slider 42.

As shown in FIGS. 3 to 5, the recording head 56 comprises first and second magnetic cores 56a and 56b. The first magnetic core 56a comprises a main pole 66, return pole (write/shield electrode) 68, junction 67, and recording coil (first coil) 71. The main pole 66 is formed of a high-permeability material and produces a recording magnetic field perpendicular to the surfaces of the magnetic disk 12. The return pole 68 is located on the trailing side of the main pole 66 serves to efficiently close a magnetic path through the soft magnetic layer 23 just below the main pole. The junction 67 connects respective upper parts of the main and return poles 66 and 68. The recording coil 71 is located so as to wind around a magnetic path including the main and return poles 66 and 68 to pass magnetic flux to the main pole 66 while a signal is being written to the magnetic disk 12.

As shown in FIGS. 3 to 6, the main pole 66 extends substantially at right angles to the surfaces of the magnetic disk 12. A distal end portion 66a of the main pole 66 on the side of the magnetic disk 12 is tapered toward the disk surface. As shown in FIG. 7, the distal end portion 66a of the main pole 66 is formed with, for example, a trapezoidal cross-section and comprises a trailing end face 67a, leading end face 67b, and opposite side faces 67c. The trailing end face 67a has a predetermined width and is located on the trailing end side. The leading end face 67b, which is narrower than the trailing end face 67a, is opposed to the trailing end face. The distal end face of the main pole 66 is exposed in the ABS 43 of the slider 42. The trailing end face 67a is almost as wide as a track of the magnetic disk 12.

As shown in FIGS. 3 to 7, the return pole 68 is substantially L-shaped and its distal end portion 68a has an elongated rectangular shape. The distal end face of the return pole 68 is exposed in the ABS 43 of the slider 42. A leading end face 68b of the distal end portion 68a extends transversely relative to the track of the magnetic disk 12. The leading end face 68b is opposed parallel to the trailing end face 67a of the main pole 66 with a write gap WG therebetween.

As shown in FIGS. 4 to 7, the recording head 56 comprises a pair of side shields 70 located individually on opposite sides of the main pole 66 along the length of the write gap GW, that is, transversely relative to the track. The side shields 70 are magnetically separated from the main pole 66 on the ABS 43. In the present embodiment, the side shields 70 are formed integrally with the distal end portion 68a of the return pole 68 from a high-permeability material, and protrude from the leading end face 68b of the distal end portion 68a toward the leading end of the slider 42. Each side shield 70 extends from the leading end face 68b of the return pole 68 to the same level as the leading end face 67b of the main pole 66.

As shown in FIGS. 3 to 6, the second magnetic core 56b of the recording head 56 comprises a first magnetic pole 72 of a high-permeability material on the leading side of the main pole 66 and a second magnetic pole 74 of a high-permeability material on the leading side of the first magnetic pole. The first magnetic pole 72 comprises a pair of first yoke portions 76, which are forked at its distal or disk-side end portion. These first yoke portions 76 are connected to the return pole 68, or in the present embodiment, to the side shields 70, individually. The second magnetic pole 74 comprises a pair of second yoke portions 78, which are forked at its distal or disk-side end portion. These second yoke portions 78 are connected to the return pole 68, or in this case, to the side shields 70, individually.

The respective upper end portions of the first and second magnetic poles 72 and 74 are connected to each other by a junction 77 of a high-permeability material. Thus, the second magnetic core 56b forms a physically closed magnetic path, a part of which includes the return pole 68. A second coil 80 that excites magnetic flux in the closed path formed by the second magnetic core 56b is arranged so as to wind around the second magnetic core 56b. The second coil 80 may be connected in series with the recording coil 71. Alternatively, these coils may be independently subjected to current supply control. As described later, currents supplied to the recording coil 71 and second coil 80 are controlled by the control section of the HDD.

As shown in FIG. 3, a protective insulating film 82 entirely covers the reproduction head 54 and recording head 56 except for those parts which are exposed in the ABS 43 of the slider 42. The protective insulating film 82 defines the contour of the head section 44.

When the VCM 15 is activated, according to the HDD constructed in this manner, the head actuator 14 pivots, whereupon each magnetic head 33 is moved to and positioned on the desired track of the magnetic disk 12. Further, the magnetic head 33 is caused to fly by airflow C that is produced between the disk surface and the ABS 43 as the magnetic disk 12 rotates. When the HDD is operating, the ABS 43 of the slider 42 is opposed to the disk surface with a gap therebetween. As shown in FIG. 2, the magnetic head 33 is caused to fly with the recording head 56 of the head section 44 inclined to be closest to the surface of the disk 12. In this state, the reproduction head 54 reads recorded data from the disk 12, while the recording head 56 writes data to the disk.

In writing data, the recording coil 71 excites the main pole 66, which applies a perpendicular recording magnetic field to the recording layer 22 of the magnetic disk 12 just below the main pole, thereby recording data with a desired track width. At the same time, as indicated by the arrows in FIG. 6, a current is passed through the second coil 80 to excite the second magnetic core 56b so that a desired magnetic field flows through the closed magnetic path including the side shields 70.

When this is done, the side shields 70 on the opposite sides of the main pole 66 make it possible to suppress magnetic flux leakage from the distal end portion 66a of the main pole 66 to adjacent tracks without reducing the quality of signals to be written to a write track. Concentration of a return magnetic field on the side shields 70 can be prevented by passing the desired magnetic field through the second magnetic core 56b that forms the closed magnetic path including the side shields 70. Thus, a magnetic field from the main pole 66 applied to the recording layer 22 is prevented from intensively returning toward the side shields 70 by the magnetic field flowing through the closed magnetic path including the side shields 70, as shown in FIG. 6. After the applied magnetic field propagates through the underlayer 23 along its surface, it gradually returns to the return pole.

Thus, recorded data in adjacent tracks off the write track can be prevented from being degraded or erased. Accordingly, data erasure in the adjacent tracks can be prevented while maintaining the recording capacity in the write track. Consequently, the track density of the recording layer of the magnetic disk 12 can be increased, so that the recording density of the HDD can be increased.

Figure 8:
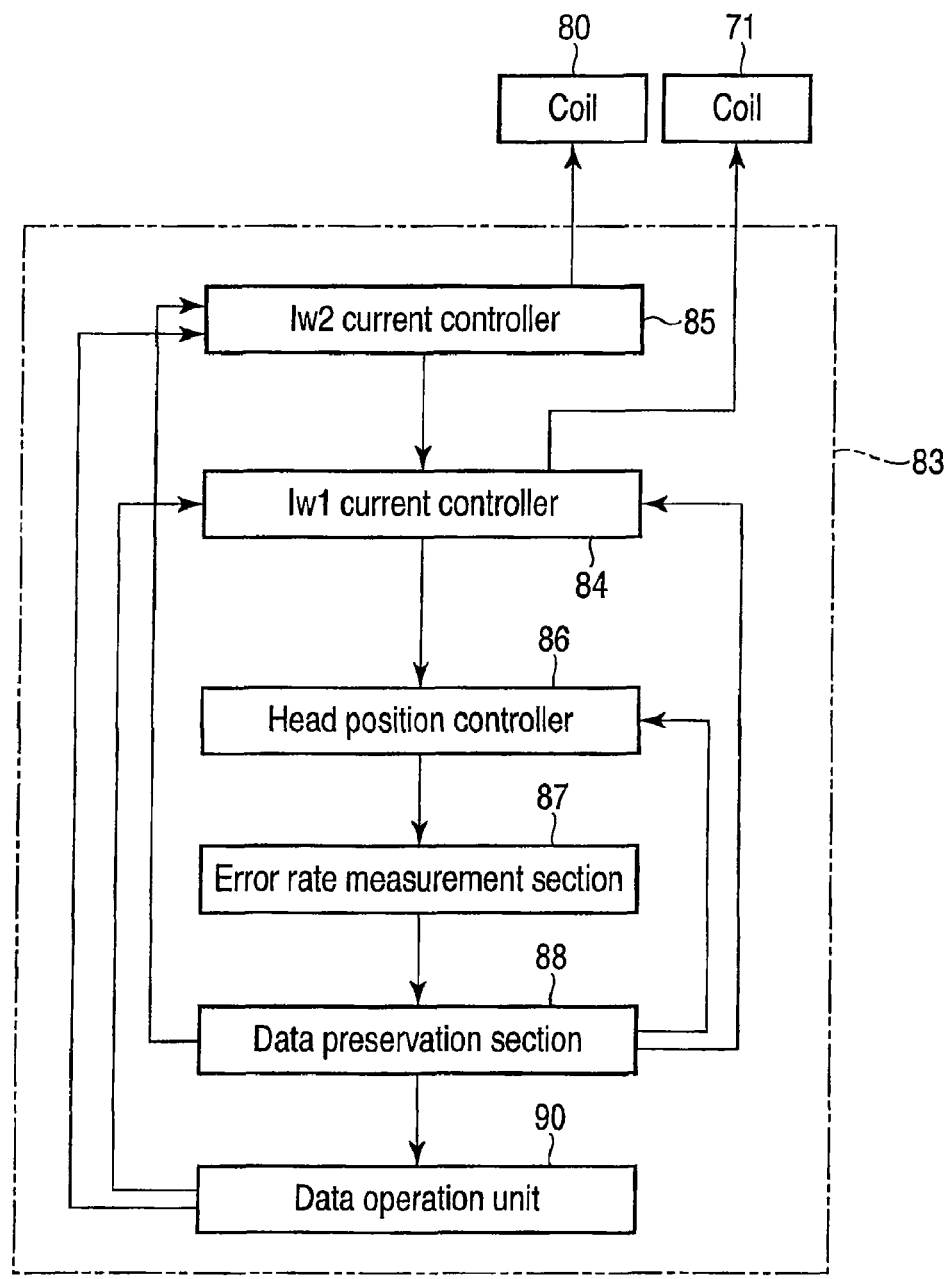
FIG. 8 is an exemplary block diagram showing a control section of the magnetic head of the HDD.

FIG. 8 is a block diagram showing the control section for controlling the currents supplied to the recording coil 71 and second coil 80. For example, a control section 83 in the printed circuit board 25 of the HDD comprises first and second current controllers 84 and 85, head position controller 86, error-rate measurement section 87, data storage section 88, and data operation section 90. The first current controller 84 sets a current Iw1 to be passed through the recording coil 71. The second current controller 85 sets a current Iw2 to be passed through the second coil 80.

In setting currents Iw1 and Iw2, current Iw2 is first set by the second current controller 85, and a random signal obtained by variously changing current Iw1 by the first current controller 84 is then recorded in the magnetic disk in a track position determined by the head position controller 86. Thereafter, the recorded data is read by the magnetic head, and an error rate is measured by the error-rate measurement section 87. After data is recorded ten thousand times in the magnetic disk in a position at a certain pitch from an initial recording track position, moreover, the error rate is measured again in the initial track position and stored in the data storage section 88.

Further, currents Iw1 and Iw2 are individually changed as the track pitch and error rate are measured and stored in the data storage section 88 in the same processes as aforesaid. Based on the data thus acquired, the data operation unit 90 calculates a current with which a minimum feasible track pitch to reduce the error rate is obtained. In this way, optimum current Iw2 to be passed through the second coil 80 is determined.

Figure 9:
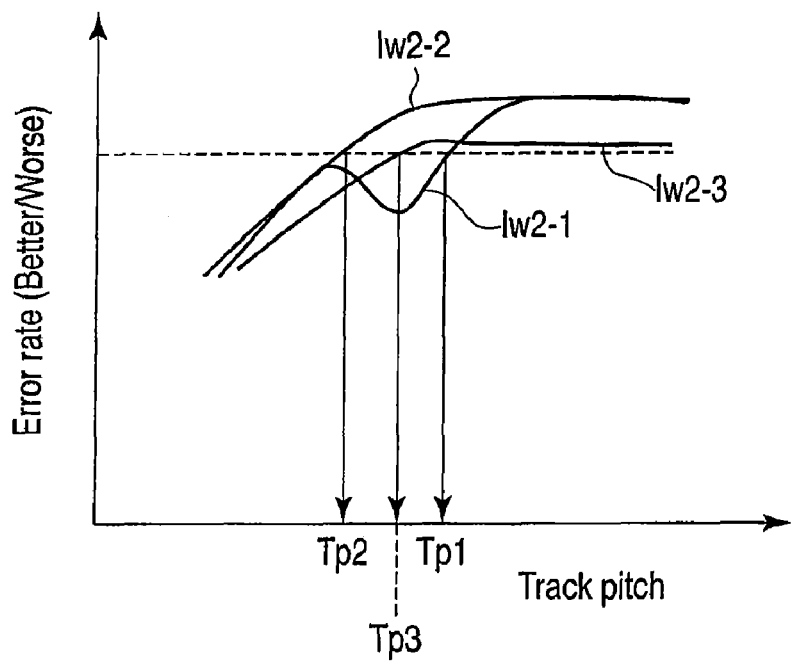
FIG. 9 is an exemplary diagram showing the relationship between the track pitch and error rate for each of supplied currents.

FIG. 9 shows fluctuations of the error rate obtained when current Iw2 and the track pitch are changed. As seen from this diagram, the relationship between the error rate and track pitch varies depending on the magnitude of current Iw2. Specifically, as the error rate and track pitch vary according to each current (Iw2-1, Iw2-2 or Iw2-3), a minimum track pitch with which a desired error rate can be achieved is assumed to be the track pitch that is realizable with current Iw2. In FIG. 8, Tp1, Tp2 and Tp3 are minimum track pitches realizable with currents Iw2-1, Iw2-2, and Iw2-1, respectively.

Figure 10:
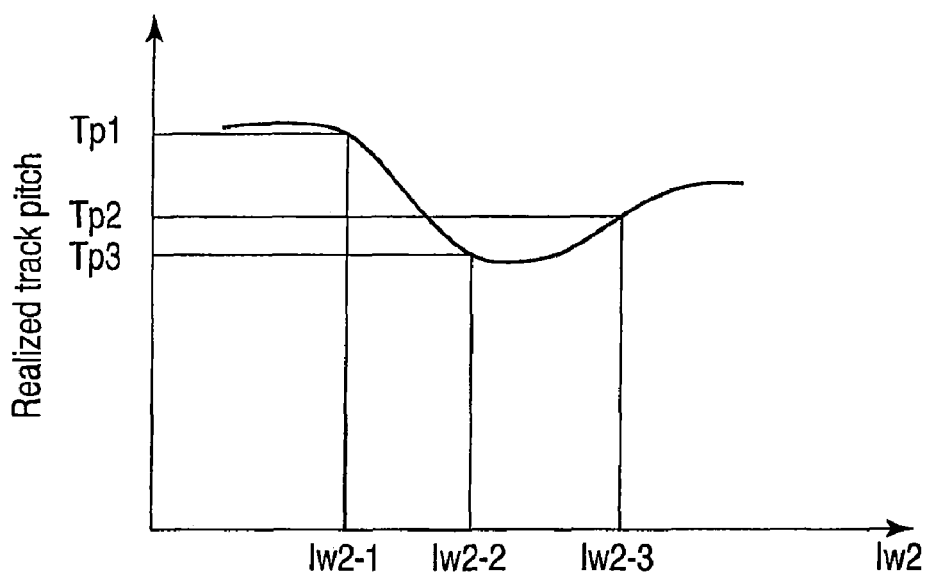
FIG. 10 is an exemplary diagram showing the relationship between each supplied current and a minimum feasible track pitch.

FIG. 10 shows the relationship between current Iw2 and realized track pitch. According to the magnetic head of the present embodiment, the track pitch can be reduced from Tp1 to Tp2 to increase the track density by setting an Iw2 set magnitude for the minimum realized track pitch by means of the current controller 85.

In connecting the recording coil 71 and second coil 80 in series, magnetic fields produced in the first and second magnetic cores 56a and 56b can be controlled with a common current Iw by appropriately setting the number of turns of each coil.

The inventor hereof prepared the magnetic head 33 according to the present embodiment and a magnetic head according to a comparative example and compared their respective bit error rates obtained during recording and reproduction operations using them. The comparative example is a magnetic head for perpendicular magnetic recording, which comprises a main pole, return pole, and side shields, but not a second magnetic core.

Figure 11:
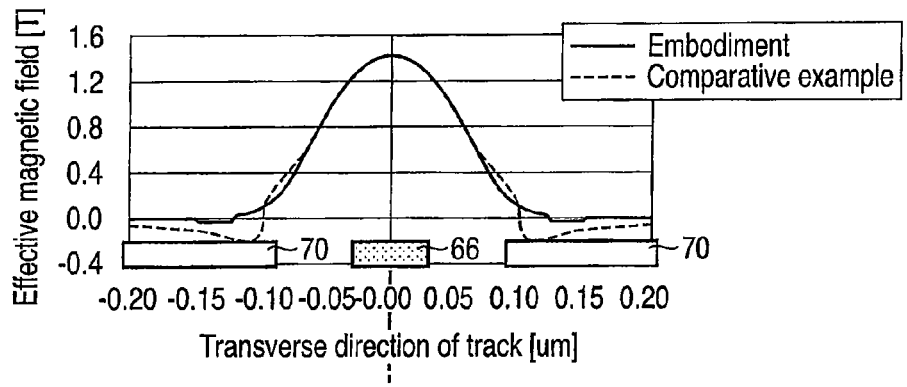
FIG. 11 is an exemplary diagram comparatively showing transverse distributions (relative to the track) of magnetic flux produced just below the main pole for each of the magnetic head of the first embodiment and a magnetic head according to a comparative example.

FIG. 11 shows transverse distributions (relative to the track) of magnetic fields produced from just below and from near the main pole with the track center of the recording head assumed to be a position 0, for each of the magnetic heads according to the present embodiment and comparative example. In the magnetic head according to the comparative example, as seen from FIG. 11, magnetic fields of opposite polarity to that of a field in the central part of a main pole 66 are produced near the respective end portions of side shields 70 on the main-pole side. In the magnetic head 33 according to the present embodiment, there exist no fringes of magnetic fields of the same polarity as that of the central magnetic field, and no opposite-polarity magnetic fields are produced either.

Figure 12:
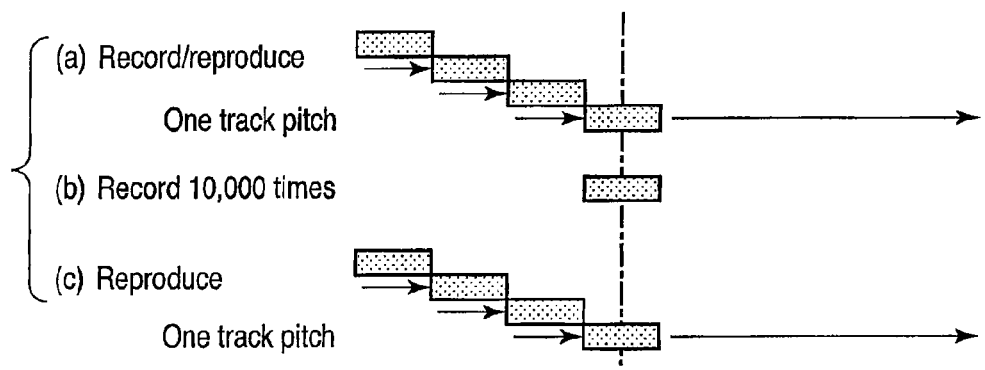
FIG. 12 is an exemplary diagram schematically showing an error-rate measurement method.
Figure 13:
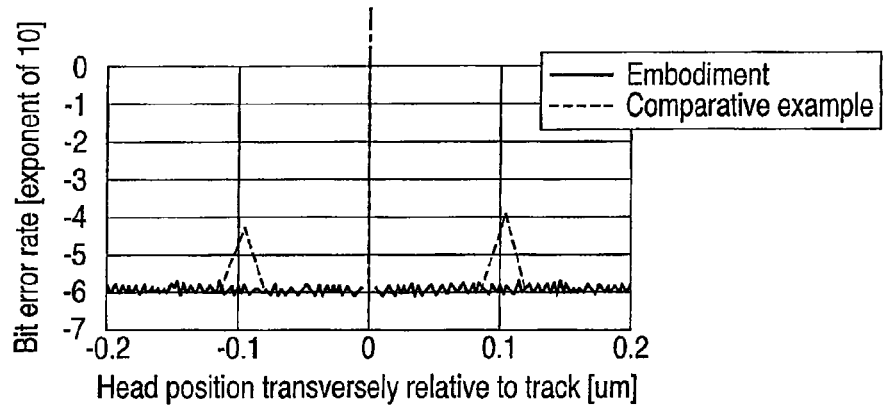
FIG. 13 is an exemplary diagram showing the relationship between the error rate and a head position transversely relative to the track for each of the magnetic heads according to the first embodiment and comparative example.

FIG. 12 is a diagram showing an error-rate measurement method for each of the magnetic heads according to the present embodiment and comparative example. FIG. 13 is a diagram showing measured error rate track profiles for comparison. In measuring the error rate, random data is recorded and reproduced for each shifting track pitch, as shown in FIG. 12(a). Then, the random data is recorded ten thousand times along the track center, as shown in FIG. 12(b). Thereafter, the error rate is measured for each shifting track pitch, as shown in FIG. 12(c). Consequently, as seen from FIG. 13, the error rate is degraded near the end portion of each side shield on the main-pole side if the recording head of the magnetic head according to the comparative example is placed on the track center. The use of the magnetic head according to the present embodiment does not result in any error rate degradation just below the side shields. Thus, the recording head of the present embodiment can accurately store recorded data for a long period of time.

According to the magnetic head of the present embodiment and the HDD provided with the same, as described above, a return magnetic field is not produced in the recording layer position just below the return pole, and recorded data can be prevented from being degraded or erased at a distant track position. There may be provided a magnetic head, configured to prevent data erasure in adjacent tracks while maintaining the recording capacity on a write track and increase the track density of a recording layer of a magnetic disk, thereby increasing the recording density, and a disk drive provided with the same.

The following is a description of a magnetic head of an HDD according to a second embodiment.

The magnetic head of the second embodiment differs from that of the first embodiment mainly in the configurations of the side shields and second magnetic core, and other configurations are the same as those of the magnetic head of the first embodiment. Therefore, like reference numbers refer to like portions of these two embodiments, and a detailed description of those portions is omitted.

Figure 14:
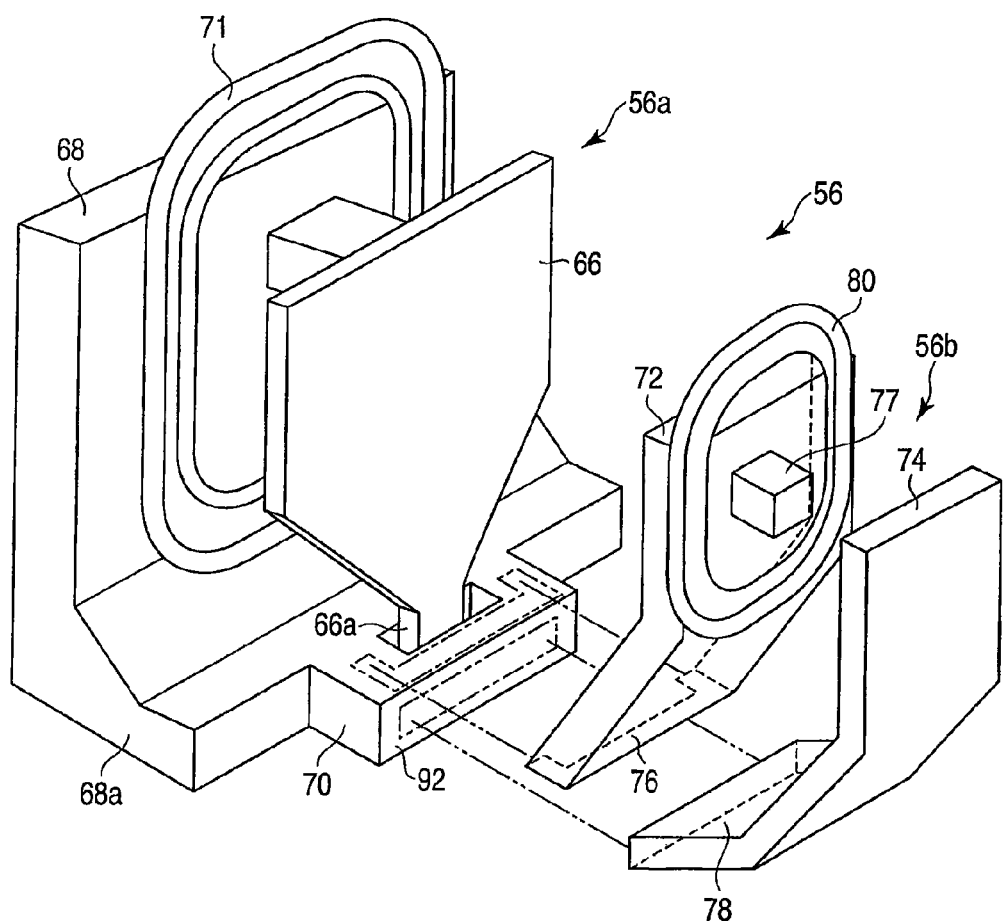
FIG. 14 is an exemplary exploded perspective view schematically showing a recording head of a magnetic head of an HDD according to a second embodiment.
Figure 15:
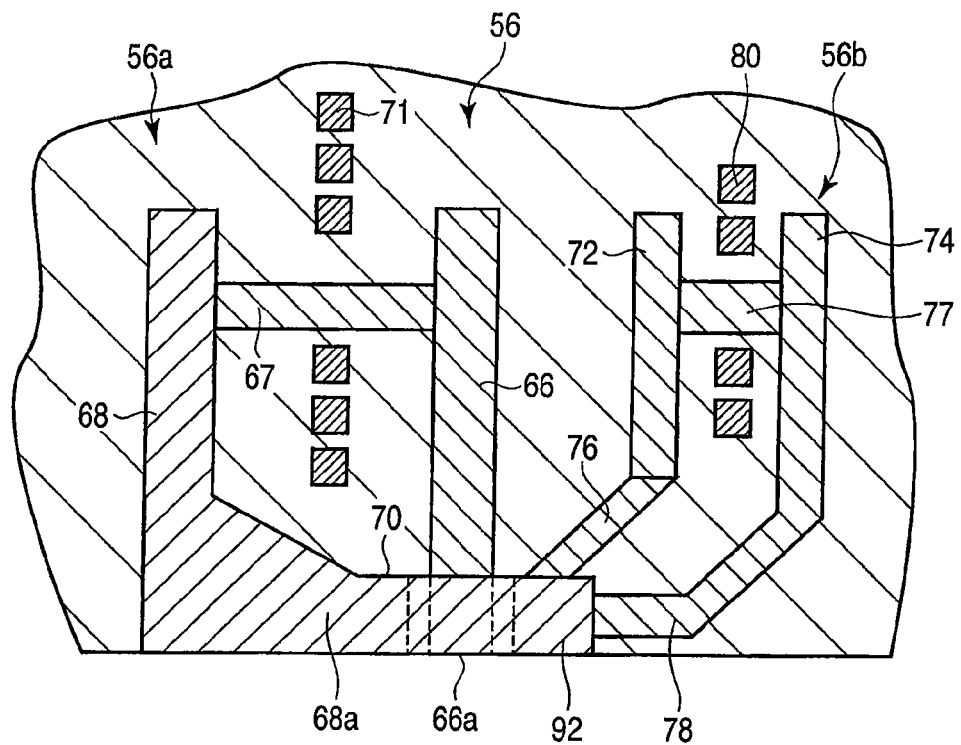
FIG. 15 is an exemplary enlarged sectional view showing the recording head of the magnetic head of the second embodiment.
Figure 16:
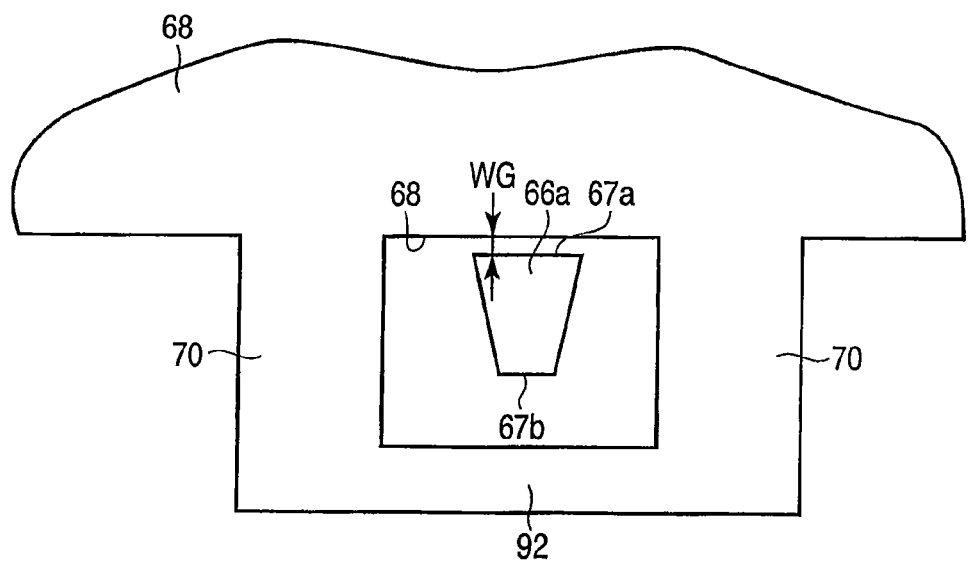
FIG. 16 is an exemplary plan view of the recording head of the magnetic head of the second embodiment taken from the side of an ABS.

FIG. 14 is an exemplary exploded perspective view schematically showing a recording head 56 of the magnetic head of the HDD according to the second embodiment, FIG. 15 is an exemplary side view schematically showing the recording head, and FIG. 16 is an exemplary plan view of the recording head taken from the side of an ABS.

According to the second embodiment, a first magnetic core 56a of the recording head 56 comprises a main pole 66 and return pole 68. A pair of side shields 70 located individually on opposite sides of the main pole 66 transversely relative to the track are formed integrally with the return pole 68 and protrude from a leading end face 68b of the return pole 68. The side shields 70 are magnetically separated from the main pole 66 on the ABS. A leading end portion of each side shield 70 projects beyond a leading end face 67b of a distal end portion 66a of the main pole 66 to the leading side. Respective extended ends of the side shields 70 are connected to each other by a junction 92. The junction 92 faces the leading end face 67b of the distal end portion 66a of the main pole 66 with a predetermined gap therebetween.

A second magnetic core 56b of the recording head 56 comprises a first magnetic pole 72 of a high-permeability material on the leading side of the main pole 66 and a second magnetic pole 74 of a high-permeability material on the leading side of the first magnetic pole. The first magnetic pole 72 comprises a first yoke portion 76 on its distal or disk-side end portion. The first yoke portion 76 is connected to the junction 92 between the side shields 70. The second magnetic pole 74 comprises a second yoke portion 78 integrally formed on its distal end portion. The second yoke portion 78 is connected to the junction 92 between the side shields 70.

The respective upper end portions of the first and second magnetic poles 72 and 74 are connected to each other by a junction 77 of a high-permeability material. Thus, the second magnetic core 56b forms a physically closed magnetic path, a part of which includes the side shields 70. A second coil 80 that excites magnetic flux in the closed path formed by the second magnetic core 56b is arranged so as to wind around the second magnetic core 56b. The second coil 80 may be connected in series with a recording coil 71. Alternatively, these coils may be independently subjected to current supply control. As in the first embodiment, currents supplied to the recording coil 71 and second coil 80 are controlled by a control section of the HDD.

In writing data, according to the magnetic head and HDD of the second embodiment constructed in this manner, the recording coil 71 excites the main pole 66 to apply a perpendicular recording magnetic field to a recording layer 22 of a magnetic disk 12 just below the main pole, thereby recording data with a desired track width. At the same time, a current is passed through the second coil 80 to excite the second magnetic core 56b so that a desired magnetic field flows through the closed magnetic path including the side shields 70.

When this is done, the side shields 70 on the opposite sides of the main pole 66 make it possible to suppress magnetic flux leakage from the distal end portion 66a of the main pole 66 to adjacent tracks without reducing the quality of signals to be written to a write track. Since the side shields 70 are provided with the junction 92 on the leading side of the main pole 66, moreover, magnetic flux leakage to adjacent tracks can be further suppressed. Concentration of a return magnetic field on the side shields 70 can be prevented by passing the desired magnetic field through the second magnetic core 56b that forms the closed magnetic path including the side shields 70. Thus, a magnetic field from the main pole 66 applied to the recording layer 22 is prevented from intensively returning toward the side shields 70 by the magnetic field flowing through the closed magnetic path including the side shields 70. After the applied magnetic field propagates through the underlayer 23 along its surface, it gradually returns to the return pole.

Thus, recorded data in adjacent tracks off the write track can be prevented from being degraded or erased. Accordingly, data erasure in the adjacent tracks can be prevented while maintaining the recording capacity on the write track. Consequently, the track density of the recording layer of the magnetic disk can be increased, so that the recording density of the HDD can be increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the materials, shapes, sizes, etc., of the constituent elements of the head section may be changed if necessary. Further, the number of magnetic disks and heads used in the magnetic disk drive may be increased as required, and the size of each magnetic disk can be variously selected.

What is claimed is:

1. A magnetic head configured to record data in a recording medium which comprises an underlayer with soft magnetic characteristics and a recording layer with a magnetic anisotropy perpendicular to a surface of the medium formed on the underlayer, comprising:
   a first magnetic core comprising a main pole, which comprises an end portion opposed to the recording medium and is configured to produce a recording magnetic field, and a return pole, a part of which is opposed to a trailing side of the main pole to define a write gap therebetween, and configured to form a magnetic circuit in conjunction with the main pole;
   a first coil configured to generate magnetic flux in the magnetic circuit comprising the main pole and the return pole;
   side shields arranged respectively on opposite sides of the main pole so as to be magnetically separated from the main pole and formed integrally with the return pole;
   a second magnetic core configured to form a physically closed magnetic path, a part of which comprises the return pole; and
   a second coil wound around the second magnetic core and configured to generate magnetic flux in the closed magnetic path comprising the second magnetic core.

2. The magnetic head of claim 1, wherein the second magnetic core comprises a first magnetic pole on a leading side of the main pole and comprising first yoke portions connected individually to the side shields, a second magnetic pole on a leading side of the first magnetic pole and comprising second yoke portions connected individually to the side shields, and a junction connecting the first and second magnetic poles.

3. The magnetic head of claim 2, wherein the side shields extend beyond the main pole to the leading side.

4. The magnetic head of claim 3, wherein the side shields are connected to each other on the leading side of the main pole.

5. The magnetic head of claim 4, wherein the first yoke portions of the first magnetic pole and the second yoke portions of the second magnetic pole are connected to a junction for the side shields.

6. A disk drive comprising:
   a recording medium comprising an underlayer with soft magnetic characteristics and a recording layer with a magnetic anisotropy perpendicular to a surface of the medium formed on the underlayer;
   a drive section configured to rotate the recording medium; and
   a magnetic head comprising a slider having a facing surface opposed to a surface of the recording medium and a head section on the slider and configured to perform data processing on the recording medium,
   the head section comprising:

a first magnetic core comprising a main pole, which comprises an end portion opposed to the recording medium and is configured to produce a recording magnetic field, and a return pole, a part of which is opposed to the trailing side of the main pole to define a write gap therebetween and configured to form a magnetic circuit in conjunction with the main pole, a first coil configured to generate magnetic flux in the magnetic circuit comprising the main pole and the return pole, side shields arranged respectively on opposite sides of the main pole so as to be magnetically separated from the main pole and formed integrally with the return pole, a second magnetic core configured to form a physically closed magnetic path, a part of which comprises the return pole, and a second coil wound around the second magnetic core and configured to generate magnetic flux in the closed magnetic path comprising the second magnetic core.

7. The disk drive of claim 6, wherein the second magnetic core comprises a first magnetic pole on a leading side of the main pole and comprising first yoke portions connected individually to the side shields, a second magnetic pole on a leading side of the first magnetic pole and comprising second yoke portions connected individually to the side shields, and a junction connecting the first and second magnetic poles.

8. The disk drive of claim 7, further comprising a head controller configured to control a magnitude of a current supplied to the second coil for obtaining a minimum feasible track pitch, based on the current supplied to the second coil and an error rate.

9. The disk drive of claim 8, wherein the head controller comprises a first current controller configured to control a current supplied to the first coil, a second current controller configured to control the current supplied to the second coil, an error-rate measurement section configured to measure the error rate, and a data operation unit configured to calculate a current with which a minimum feasible track pitch to reduce the error rate is obtained, based on currents supplied from the first and second current controllers and the error rate measured by the error-rate measurement section.

* * * * *